Jan. 9, 1951 C. F. FORBES 2,537,521
SWINGING AXLE WITH CASTER WHEELS
Filed Aug. 19, 1948 2 Sheets-Sheet 1
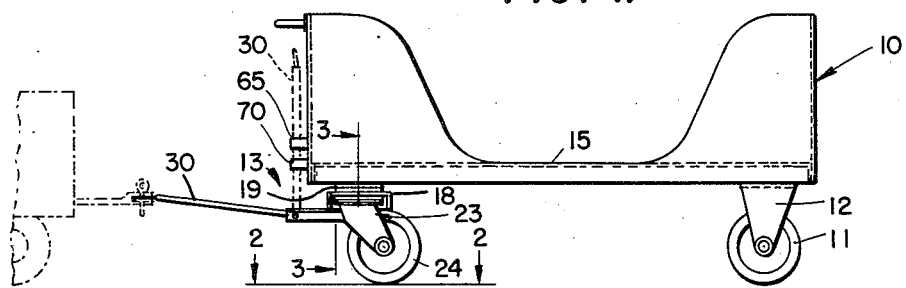
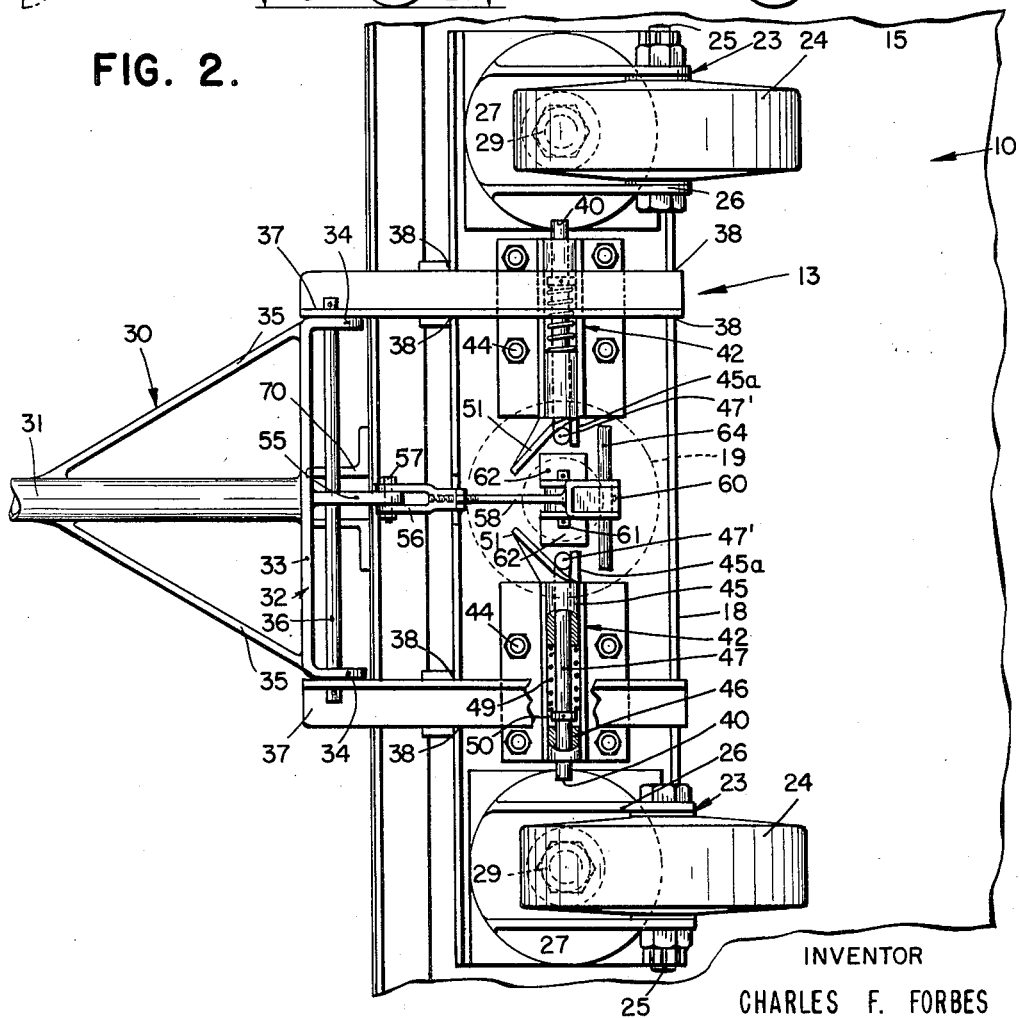
INVENTOR
CHARLES F. FORBES
BY
Mason & Graham
ATTORNEYS Jan. 9, 1951        C. F. FORBES        2,537,521
SWINGING AXLE WITH CASTER WHEELS
Filed Aug. 19, 1948        2 Sheets-Sheet 2
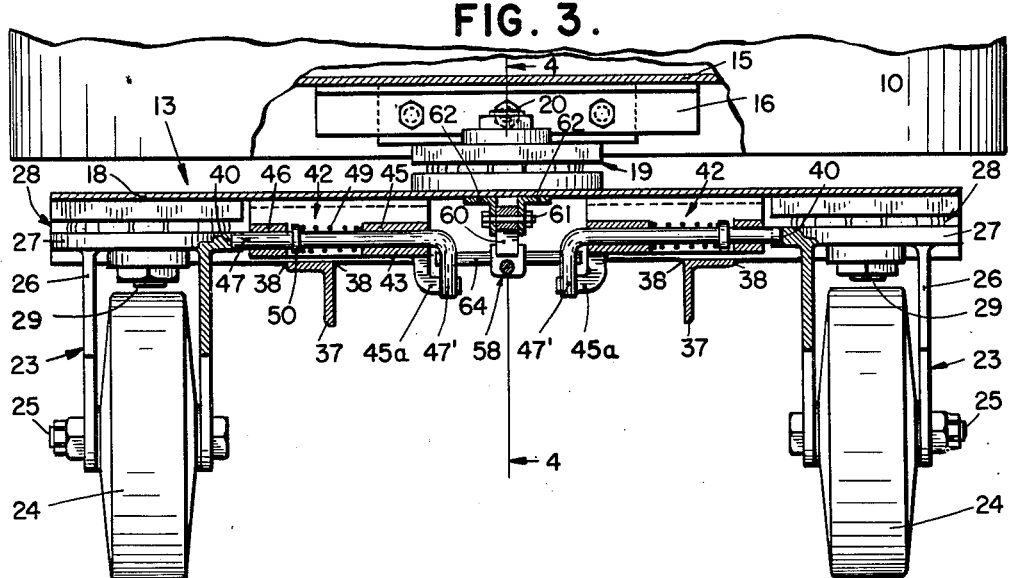
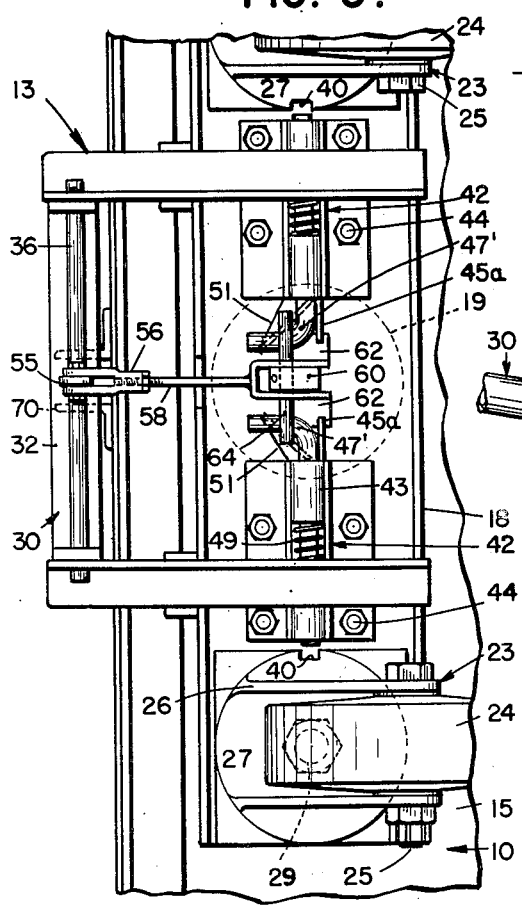
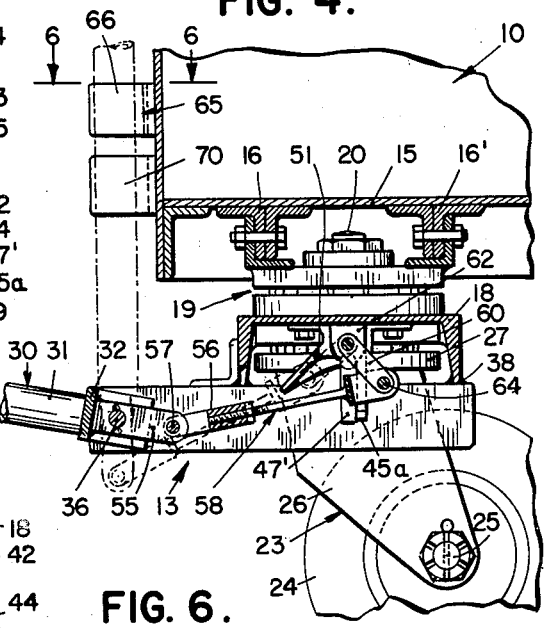
INVENTOR
CHARLES F. FORBES
BY
*Mason & Graham*
ATTORNEYS Patented Jan. 9, 1951

2,537,521

UNITED STATES PATENT OFFICE 2,537,521

SWINGING AXLE WITH CASTER WHEELS

Charles F. Forbes, Los Angeles, Calif.

Application August 19, 1948, Serial No. 45,127

3 Claims. (Cl. 280—116)

This invention has to do with vehicles of the type having casters or swiveled wheels.

The advantages of caster-wheeled trucks used for handling materials in industry, including the ease of manual handling of such trucks, are well known. Ordinarily no springs are employed between the casters and the body of the vehicle, such vehicles being designed for only slow movement. However, there are many instances where it is desirable or necessary to move such caster-wheeled trucks at higher speeds that that for which they are designed. For example, such trucks are often towed, singly or in trains, by powered vehicles. Difficulties are then encountered since invariably the leading casters individually will leave the ground where there is the slightest unevenness, and in this position fail to trail or track properly. Consequently damage frequently results when the wheels again contact the ground since they receive a sudden jar and may be facing at an angle to the direction of travel. Furthermore, the casters will shimmy on any surface at increased speeds. Another disadvantage is that caster-wheeled vehicles of conventional construction cannot be controlled when towed down-grade, the vehicles tending to jack-knife.

It, therefore, is an object of this invention to provide a construction or mounting enabling the use of casters on trucks of the type indicated which imparts to the vehicle the advantages of the ordinary type of caster-wheeled vehicle together with the advantages of vehicles having a pair of leading pivotally mounted wheels which are connected for corresponding and controlled pivotal movement.

A particular object is to provide a caster mounting construction wherein a pair of casters at the forward end of a vehicle may be permitted either to swivel about their vertical individual axes or locked against such individual swiveling and be associated for controlled pivotal movement together about a single vertical axis.

More particularly an object of the invention is to provide a construction providing for the mounting of a pair of casters at the forward end of the vehicle on a member which itself is pivotally mounted on the vehicle, together with means for locking either the two casters against individual swiveling or the said member against pivotal movement.

These and other objects will be apparent from the drawings and the following description thereof. Referring to the drawings:

Fig. 1 is a side elevational view of a truck or cart embodying the invention;

Fig. 2 is an inverted plan view of the caster mounting construction embodying the invention as on the line 2—2 of Fig. 1;

Fig. 3 is a cross sectional view on the line 3—3 of Fig. 1;

Fig. 4 is a sectional view on line 4—4 of Fig. 3;

Fig. 5 is a fragmentary inverted plan view similar to Fig. 2, but showing the parts in a different position; and Fig. 6 is a section on line 6—6 of Fig. 4.

More particularly describing the invention, reference numeral 10 generally indicates the body of a truck or cart which is provided with a pair of rear wheels 11 mounted on any suitable wheel supports 12. Mounted at the forward end of the truck is a caster or wheel mounting generally indicated by 13 which will be described in detail.

Referring particularly to Figs. 2–5 inclusive, the body of the truck 10 may be of any suitable size and shape and is shown as being provided with a floor 15 to which are attached, as by means of welding, depending mounting flanges indicated by 16 and 16′ which extend for a limited distance transversely of the truck. The mounting flanges support the wheel mounting 13. The wheel mounting includes what may be termed a fifth wheel plate 18 or axle in the form of a channel shaped beam which is secured to the mounting flanges for pivotal movement with respect thereto by means of the bearing 19 and king pin 20. It is contemplated that any suitable swivel connection may be utilized for securing the member 18 to the under side of the body of the truck 10.

A pair of casters 23 are mounted on the member 18, one at each end thereof.

The casters each include a roller or wheel 24 rotatably mounted on axle pin 25 supported in a bifurcated wheel mounting 26 the upper end of which is formed to provide a plate 27 forming part of a bearing 28 which includes a king pin 29. The mounting 26 is so formed that the axis of rotation of the wheel 24 is offset radially of the axis about which the mounting 26 may swivel as is usual with casters so that the caster wheel 24 will normally trail when the vehicle is moved.

The plate 18 is provided with a draw-beam indicated by numeral 30 which includes an elongated central member 31 and an attaching bracket 32, the latter comprises the cross member 33 which terminates in a pair of rearwardly extending ends 34 and the diagonal braces 35. The ends 34 of the member 33 are apertured to receive a shaft 36 which is mounted in a pair of flanges 37 secured to the undersurface of the axle 18 by means of welding 38.

As will later become apparent, the draw-beam 30 is not only adapted for towing the vehicle, but is also utilized as a control member for actuating mechanism for locking the individual casters against swiveling or for locking the axle 18 against swiveling.

In order to provide for locking the individual casters 23 against swiveling, the plate 27 of each caster mounting is provided with a notch or recess 40 located at the inner edge of the plate when the caster is in trailing position at right angles to the longitudinal axis of the axle 18.

A pair of latches, each indicated by numeral 42 are mounted on the axle 18 inwardly of and respectively adjacent each of the casters 23. These latches each comprise a body 43 which is secured to the plate by bolts 44. The body has a centrally disposed interrupted pin housing comprising an inner part 45 and an outer part 46. A latch pin 47 is mounted in the housing and is normally urged outwardly by a spring 49 interposed between the part 45 and a collar 50 on the pin.

The inner end of the body 43 is provided with an inwardly extending angularly disposed cam 51 which is adapted to be engaged by the outer end 47' of the latch pin which extends at right angles to the remainder of the pin.

In order to provide a means for actuating the latch pins, the inner end of the draw-beam 30 is provided with a tongue 55 to which is attached a fitting 56 by means of pin 57. The fitting 56 receives a lever 58, one end of which is threadedly mounted in the fitting and the other end of which is bifurcated and pivotally mounted on a supporting link 60 attached to the axle 18 by pin 61 mounted in brackets 62 on axle 18. The lever 58 also supports a pin 64 which extends at right angles thereto and is long enough to engage the inner ends of the two latch pins 47.

It will be apparent from the construction described that with the draft-beam 30 in lowered or towing position, such as shown in Figs. 1, 2 and 4, that the latch pins 47 will be forced outwardly by their springs 49, ends 47' being pivoted downwardly by cams 51, into position to engage the notches 40 in the plates 27 of the casters, thereby serving to lock the casters against swiveling. The ends 47' of latches 47 are restrained from pivotal movement by the stops 45a. When the beam 30 is in this lowered position, the entire plate 18 and the two casters then operate as a unit with the plate being free to pivot or swivel about the axis of the king pin 20.

It will also be apparent that when the draft-beam 30 is raised to the broken line position of Fig. 1, that the lever mechanism attached to the beam will cause the two latch pins 47 to be pulled inwardly out of notches 40 in caster plates 27 by pin 64 pulling the inner ends of the latch pins forward on cams 51 thereby freeing the casters for swiveling. Any suitable means such as the spring latch 65 (Figs. 4 and 6) may be used for releasably holding the beam in upper position. This latch comprises a U-shaped bracket 66 attached to the body of the vehicle and flat springs 68 therein. It is also desirable to provide a guide plate such as the U-shaped member 70 which receives the beam for maintaining the draw-beam and axle 18 against pivoting about the axis represented by the king pin 20. It will be apparent that when the beam 30 is raised, the plate 18 is locked against pivotal movement while the casters are free to swivel. On the other hand, when the draw-beam is lowered, the casters are locked against swiveling and the plate 18 is free to pivot.

It is contemplated that various changes and modifications can be made in the apparatus shown and described without departing from the scope of the invention as defined in the claims.

I claim:

1. A caster type wheel mounting means for a vehicle comprising an axle pivotally mounted on the vehicle, a pair of wheels mounted on said axle for individual swiveling, wheel lock means for locking said wheels against swiveling, anti-pivot means for preventing said axle from pivoting, and actuating means operatively interconnecting said wheel lock means and said anti-pivot means to selectively operate the same.

2. In a wheeled vehicle, a towing and wheel support means adapted for mounting at one end of the vehicle comprising, an axle pivotally mounted on the vehicle, a pair of wheels mounted to swivel on said axle, a pair of latches mounted on said axle and engageable with said wheels for locking the wheels with their axes of rotation parallel to said axle, a draw-beam mounted on said axle for pivotal movement in a vertical plane, and means operatively connecting said draw-beam and said latches for actuating said latches to a non-locking position upon movement of said draw-beam to a given position.

3. In a wheeled vehicle, a towing and wheel support means adapted for mounting at one end of the vehicle comprising, an axle pivotally mounted on the vehicle, a pair of wheels mounted to swivel on said axle, a pair of latches mounted on said axle and engageable with said wheels for locking the wheels with their axes of rotation parallel to said axle, a draw-beam mounted on said axle for pivotal movement in a vertical plane, means operatively connecting said draw-beam and said latches for releasing said latches to locking position upon downward movement of said draw-beam, and means on said vehicle engageable with said draw-beam when the beam is in upward position for confining said beam against lateral movement and said axle against pivotal movement.

CHARLES F. FORBES.

REFERENCES CITED

The following references are of record in the file of this patent:

UNITED STATES PATENTS

| Number | Name | Date |
|---|---|---|
| 292,680 | Rausch | Jan. 29, 1884 |
| 1,676,381 | Callison | July 10, 1928 |
| 2,130,418 | Du Pont et al. | Sept. 20, 1938 |
| 2,325,822 | Whitmer | Aug. 3, 1943 |

FOREIGN PATENTS

| Number | Country | Date |
|---|---|---|
| 9,323 of 1913 | Great Britain | Dec. 11, 1913 |